Jan. 23, 1968 TETSUO DOI ET AL 3,365,543

THERMOPLASTIC RECORDING APPARATUS FOR TELEVISION SIGNALS

Filed Sept. 6, 1963 3 Sheets-Sheet 1

INVENTORS
Tetsuo Doi
Kiyohiko Tanno
Hiroyasu Hashimoto

By Paul M. Craig, Jr.
ATTORNEY

THERMOPLASTIC RECORDING APPARATUS FOR TELEVISION SIGNALS

INVENTORS
Tetsuo Doi
Kiyohiko Tanno
Hiroyasu Hashimoto
By Paul M. Craig, Jr.
ATTORNEY

THERMOPLASTIC RECORDING APPARATUS FOR TELEVISION SIGNALS

Filed Sept. 6, 1963 3 Sheets-Sheet 3

INVENTORS
Tetsuo Doi
Kiyohiko Tanno
Hiroyasu Hashimoto
By Paul M. Craig, Jr
ATTORNEY United States Patent Office 3,365,543
Patented Jan. 23, 1968

3,365,543

THERMOPLASTIC RECORDING APPARATUS FOR TELEVISION SIGNALS

Tetsuo Doi and Kiyohiko Tanno, Hitachi-shi, and Hiroyasu Hashimoto, Tokyo, Japan, assignors to Hitachi, Ltd., Tokyo, Japan, a corporation of Japan Filed Sept. 6, 1963, Ser. No. 307,194
2 Claims. (Cl. 178—6.6)

This invention relates to electrostatic recording apparatuses and provides an improved electrostatic recording apparatus which comprises an optical lens system through which an optical image is projected on a previously electrically charged layer of a photoconductive substance to form a latent electrostatic charge image thereon, means for transferring said latent charge image onto a film of a thermoplastic resin, means for heating and softening said film to obtain a deformed uneven image on said film by the coulomb force of the electrostatic charges on said film, said deformed image being subsequently cooled to set, and a Schlieren optical system for converting said deformed image back into an optical image.

The technique of forming an electrostatic charge image on a transparent thermoplastic resin film and heating the latter to obtain a deformed image thereon is in use, for example, in the observation and recording of Lichtenberg discharge patterns and has been well known in the art of thermoplastic recorders. Also, the television technique of forming a latent electrostatic charge image on a liquid oil surface by an electron gun under control of a television signal and reproducing the television signal as an optical image projecting through a Schlieren optical system the liquid surface image, which is deformed by the Coulomb force of the image charges, has been well known in the Eidophor system.

Each of these previously known systems necessitates a special electric gun for writing information signals, and the electric gun as well as the casing to be loaded with a thermoplastic resin must be maintained under a vacuum of $10^{-4}$ mm. Hg or under, necessitating a complicated and expensive evacuating device, which itself does not serve the purpose of giving electrostatic charges.

The present invention is intended to overcome these difficulties previously met in the art of electrostatic recording.

A primary object of the present invention is to provide an entirely novel recording apparatus which relies on the technique of electron photography for the recording of optical images and is simple in construction dispensing with any evacuating device.

Another object of the present invention is to provide a recording apparatus adapted to form an optical image in a continuous fashion by use of a drum carrying a layer of a photoconductive substance.

A further object of the present invention is to provide a television picture recording apparatus adapted to record only a fraction of the total number of picture frames selected by an electron shutter to include one in each odd number of consecutive frames thereby to save the recording film without involving any undesirable flicker effect.

A still further object is to provide a recording apparatus for use in taking pictures of scenes and like subjects which performs a preliminary mesh or raster exposure before or after the picture-taking or simultaneously therewith to obtain a precise optical image of the scene.

Yet another object of the invention is to provide an optical image recording apparatus which is arranged to place a transparent thermoplastic resin film in contact with an electrically charged layer of a photoconductive substance and to project a light image upon said photoconductive layer from behind the latter, and which also is effective to attain said primary object.

These and other objects, features and advantages of the present invention will become apparent from the following description when taken in conjunction with the accompanying drawings, which illustrate several embodiments of the invention and in which.

Figures 1A, 1B, 1C, 1D, 1E, 2:
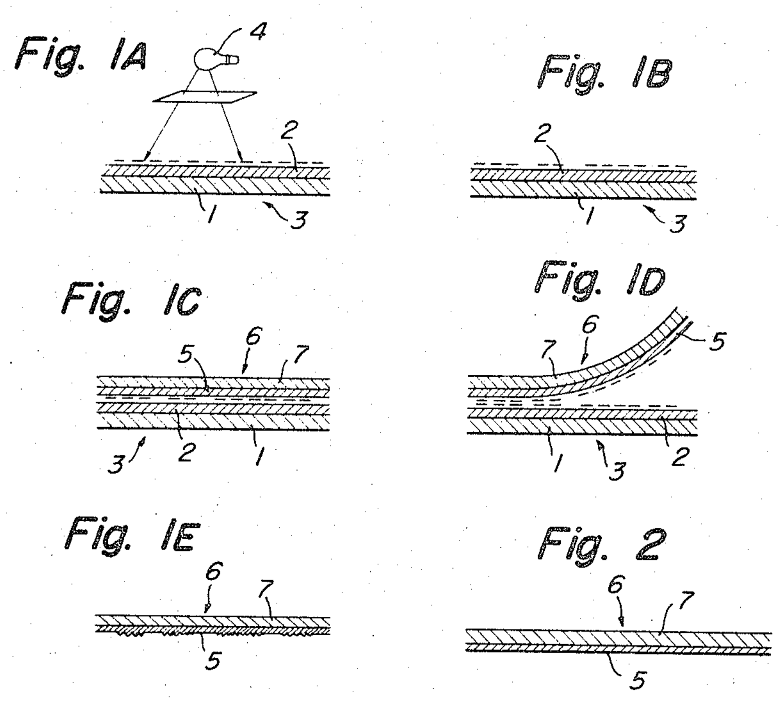
FIGS. 1A to 1E illustrate the basic principles of the electrostatic transcription.
FIG. 2 illustrates in cross section the recording film used in the apparatus of the present invention.

Referring first to FIG. 1, reference numeral 1 designates a base on which a layer of a photoconductive light sensitive substance 2. The photoconductive layer 2 may be formed on the base 1 by coating or vapor depositing of zinc oxide (ZnO) or selenium (Se).

When the light sensitive sheet 3 formed in this manner is passed through a corona discharge, the surface of the photoconductive light sensitive layer 2 is electrically charged. Under this condition, if an optical image is projected by light radiation from a light source 4, onto the surface of the photoconductive light sensitive layer 2, as shown in FIG. 1A, that area of the light sensitive layer 2 upon which the light impinges is made electrically conductive and thus discharged. As the result, a latent electrostatic charge image is obtained on the surface of the light sensitive layer 2 according to the presence or absence of electric charges thereon which corresponds to the shade of the optical image projected, as shown in FIG. 1B. The surface carrying the latent charge image is brought into contact with a film 6 having a thermoplastic resin layer 5 formed thereon (FIG. 2) and is passed together therewith through an electric biasing field to transfer the latent charge image onto the surface of the thermoplastic resin layer 5, as shown in FIG. 1D. The thermoplastic resin layer 5 is subsequently heated to soften to allow the Coulomb force of the electrostatic charges to deform the surface of the thermoplastic resin layer. The surface deformation is then fixed by cooling the resin layer 5 and a deformed image is obtained on the surface of the resin layer, as illustrated in FIG. 1E.

The film 6 includes a transparent film base 7 having a thickness of the order of from 50 to 137$\mu$ and formed of a base material such as polyethylene terephthalate or diacetate or triacetate film material. The thermoplastic resin layer 5 is formed by coating the base 7 with a mixture of ester rubber, cumar or styrene resin with additives blended to obtain characteristics favorable to formation of deformed images with respect to the electrical insulation, melting point, viscosity, surface tension, etc., while at the same time enhancing the coatability and flexibility of the mixture. Most critical among the characteristics of the thermoplastic resin layer 5 are its electrical insulation properties obtained at its melting point as no deformed image can be formed if the charges are dissipated when the layer is heated for image development. In addition, the melting point of the thermoplastic material determines the temperature to which it is heated for image development and the surface tension affects the sensitivity of the layer, that is, the relationship between the deformation and electric charges. Further, the viscosity of the material has a relation to the required developing time. Accordingly, the thermoplastic resin material should have satisfactory characteristics to meet these conditions. Such thermoplastic resin material is coated even over the surface of the film base 7 to a thickness of from 5 to 100$\mu$.

The transferring technique described above has the following advantageous features over conventional systems which employing an electron gun for writing electrostatic charge images and involve various disadvantages as pointed out hereinbefore.

Firstly, according to the present technique, the film can be charged per unit area in a quantity approximately $10^2$ times that of electric charges conventionally given by use of an electron gun and therefore can be deformed to a much higher extent. This allows use of films of a limited sensitivity to deformation since the deformation sensitivity of a film depends upon the quantity of given charges and upon the magnitude of deformation caused by their Coulomb force. Secondly, the phenomenon is observed with any electron gun system that electric charges penetrate deep into the material of the film to reduce the deforming effect of the Coulomb force particularly when electrons emitted collide against the film with a high energy. In contrast, according to the present electrostatic transfer technique all charges given to the film lie on the surface of the film and are fully effective to deform its surface. Finally, in cases where an electron gun is used for electron radiation, complicated adverse effects are involved because of the secondary electron emission from the film caused by the electron bombardment. It will be apparent that the present technique never involves such emission of secondary electrons.

Figure 3:
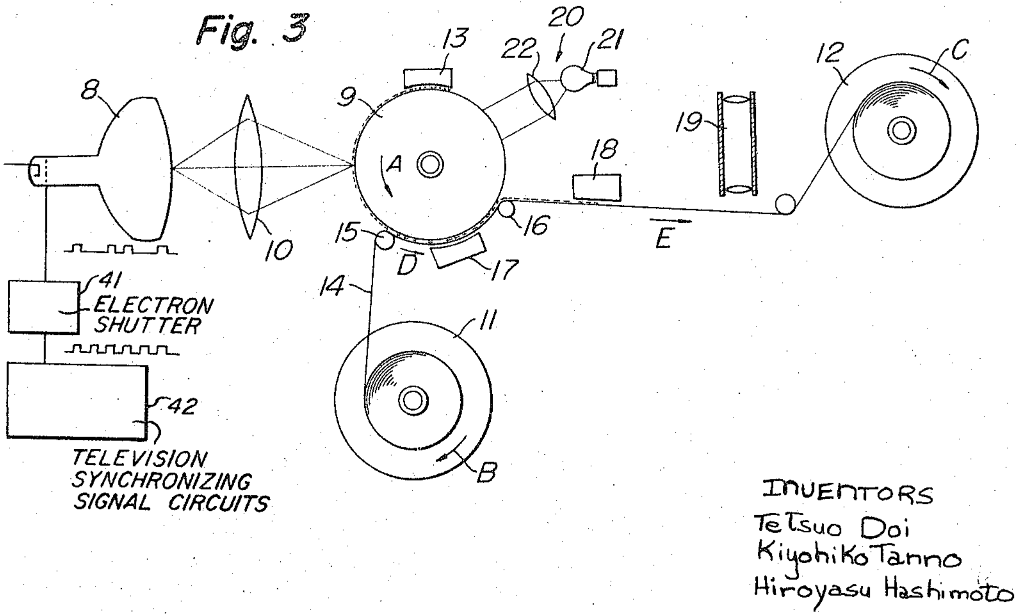
FIG. 3 is a diagrammatic view of one form of recording apparatus for recording the wave pattern appearing on a cathode-ray tube.

A specific embodiment of the present invention will next be described with reference to FIG. 3. The illustrated embodiment represents a novel form of television recorder serving the purpose of recording picture images formed in the cathode-ray tube 8 of a television receiver. Arranged in front of the cathode-ray tube 8, having a fluorescent screen on which optical images are formed, is a lens system 10 for projecting the optical image formed on the cathode-ray tube 8 onto photoconductive drum 9, which has a layer of selenium, a photoconductive light sensitive material, formed on the surface. The photoconductive drum 9 is driven from a motor to rotate in synchronism with the film speed-like shafts carrying film reels 11 and 12, respectively. Arranged close to the photoconductive drum 9 is a corona forming unit 13 for electrically charging the photoconductive light sensitive surface of the drum. The corona forming unit 13 is designed to produce a high potential of 5 to 7 kilovolts to cause a corona discharge between the unit and the photoconductive drum 9 to charge the surface of the latter to a potential of 400 to 500 volts.

Reference numeral 14 indicates a film coated over its surface with a thermoplastic resin of the character as described hereinbefore and extending between reels 11 and 12. A pair of spaced guide rollers 15 and 16 are arranged close to the periphery of the photoconductive drum 9 for rotation of a definite speed for the purpose of placing the film in contact with the peripheral surface of the photoconductive drum 9 in a region sufficiently spaced from the corona forming unit 13 to allow optical images formed on the cathode-ray tube 8 are projected directly upon the surface of the drum 9. The film 14 used with the present apparatus includes a base formed of polyethylene terephthalate or triacetate and having a thickness of from 50 to 135$\mu$ and a layer of a thermoplastic resin coated on the base. The thermoplatsic resin material contains a major ingredient such as ester rubber or cumar resin and 2 to 20% of styrene-butadiene copolymer added to improve the filming characteristics of the material.

A biasing field forming unit 17 is disposed adjacent to the photoconductive drum 9 at a point between the guide rollers 15 and 16 for the purpose of forming a biasing field to facilitate the transfer of electrostatic charge images formed on the surface of the photoconductive drum onto the surface of the film 14. The biasing unit used may be of the same construction as the corona forming unit described above. The biasing unit may be dispensed with in cases where electrostatic charge images formed on the photoconductive drum can be readily transferred onto the film or the surface of the photoconductive drum 9 is fully charged.

A heating device 18 is provided for image development and may be of any desired type, high frequency, infrared, or hot blast. An optical monitoring unit 19 including a Schlieren optical system is provided between the heating device 18 and the take-up reel 12 for monitoring the picture images being recorded on the film 14. The distance between the heating device 18 and reel 12 is determined so as to allow the thermoplastic resin heated for image development to be cooled fully to fix the developed images thereon before they reach the reel 12. A light exposure unit indicated generally at 20 serves to wipe out any charged smear remaining on the surface of the photoconductive drum 9 after the image formed thereon has been transferred to the film and includes a light source 21 which uniformly irradiates the drum surface through a lens system 22.

In operation of the present television recorder, the photoconductive drum 9 is driven in a direction indicated by the arrow A and its surface moving past the corona forming unit 13 is uniformly charged by the corona discharge to a potential of 400 to 500 volts. The charged drum surface is then scanned by the light rays issuing from the beam spots on the cathode-ray tube 8 and impinging on the drum surface through lens system 10. The brighter the beam spot, a larger increase in electric conductivity of the selenium layer on the photoconductive drum 9 is obtained and the electrostatic charges carried on the respective minute areas of the selenium layer are discharged in accordance with the brightness of the beam spots on the cathode-ray tube. It will be noted, therefore, that the surface area of the photoconductive drum 9 immediately after it has passed through the scanning station carries a latent image including electrostatic charges in different densities. As the drum continues to rotate, the latent image carrying area of the drum surface is brought into pressure contact with the surface of film 14 carrying a thermoplastic resin layer. It is to be understood that the film 14 is fed in a direction indicated by the arrow by rotation of film reels 11, 12 in the respective directions indicated by the arrow B and C at a speed in synchronism with the peripheral speed of the photoconductive drum 9 so that no slippage is caused between the film 14 and photoconductive drum 9. It will be apparent that the film 14 proceeds at a predetermined rate along the peripheral surface of the drum 9 in close contact therewith owing to the provision of guide rollers 15 and 16. During the passage of the film and the drum surface between the guide rollers the latent electrostatic charge images previously formed on the drum surface is transferred with high efficiency as an electric biasing field is formed by the biasing field forming unit 17 disposed between the guide rollers. Subsequently, the film 14 is separated from the photoconductive drum 9 and heated by the heating device 18 and softened so that deformed images are formed on the surface of the thermoplastic resin layer by virtue of the Coulomb forces of the electric charges thereon. After the film has passed the heating device 16, it is cooled naturally or by forced cooling so that the deformed images on the film is fixed. The film 14 is then wound about the film reel 12 while being monitored by the monitoring unit 19.

On the other hand, the surface of the photoconductive drum 9 immediately after it has been separated from the film 14 is contaminated with the remaining electrostatic charges. These charges are completely removed from the drum surface as it is irradiated uniformly by light rays from the exposure unit 20 when the drum surface passes under the latter. The drum surface thus cleared of any electric charges again passes under the corona forming unit 13 to be uniformly charged and proceeds to the scanning station.

With the present television recorder, there is no need of employing an evacuating apparatus since the recorder employs electrically charged photoconductive drum 9 which is scanned by light rays from the beam spots formed on the cathode-ray tube 8 of a television receiver. In addition, the scanning procedure permits the latent electrostatic images formed on the drum to be transferred onto a film in a continuous fashion. It will be readily recognized, therefore, that the present recorder can be very conveniently used in the recording of a continuous form of information.

With such television recorder, it has been found that the film comsumption may conveniently be reduced by discarding part of the available signal information without the danger of causing any flickering effect.

Figure 7:
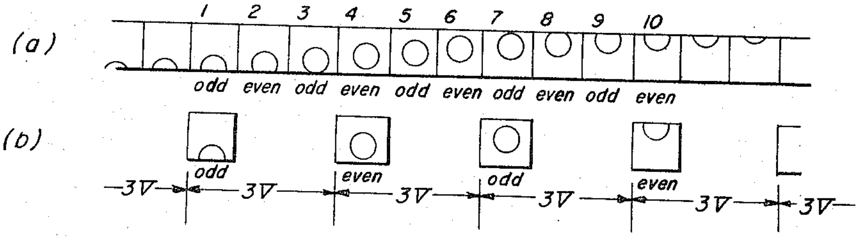
FIG. 7 is a representation of the time relationship between the television frames and the film recording whereby alternate odd and even numbered frames are received for recording.

With the standard television system, which employs the so-called interlaced scanning technique as indicated in FIGURE 7(*a*) of the drawings, only a coarse striped pattern of pictures would result if either the odd-numbered or the even-numbered frames of the broadcast television were received. To avoid this, it is necessary to take out alternately odd-numbered and even-numbered frames. For example, in the case where the cathode-ray tube 8 of the television receiver is scanned at the rate of sixty frames per second, the consumption of the recording film can be reduced to one-third by taking out one of each three consecutive frames in the manner shown in FIGURE 7(*b*) by use of an electron shutter such as 41 in FIGURE 3 to record frames at the rate of 20 frames per second. It will be apparent that the rate of 20 frames per second at which pictures are reproduced is enough to avoid any flickering effect in view of the fact that ordinary 8 mm. motion pictures employ the rate of 16 frames per second.

An electron shutter device usable with the present apparatus will now be described in detail.

If a biasing voltage is impressed upon the grid of the cathode-ray tube 8 of a television receiver at a predetermined frequency to interrupt the electron stream therein, no optical image appears on the fluorescent face of the cathode-ray tube 8 during the time when the biasing voltage is upon the grid. Accordingly, the number of frames to be recorded in each second can be reduced to one-third by impressing a biasing voltage upon the grid of the cathode-ray tube 8 in a manner so that the electron stream therein is cut off during the time when two of each three consecutive frames are scanned and is allowed to pass during the scanning of the remaining one frame. Accordingly, the number of optical image frames appearing on the fluorescent face of the cathode-ray tube 8 can be reduced to the one-third of the specified number of frames by use of a device 41 arranged to operate repeatedly in synchronism with the synchronizing signal derived from a television synchronizing signal circuit such as 42 and used in scanning the cathode-ray tube 8. By this means, the speed at which the film 14 is driven to record such optical image can be reduced to one-third of the film speed required when the specified number of frames are scanned. This is very desirable from the stand-point of film consumption and in other words means that the same length of film can serve for three times the standard recording time.

Figure 4:
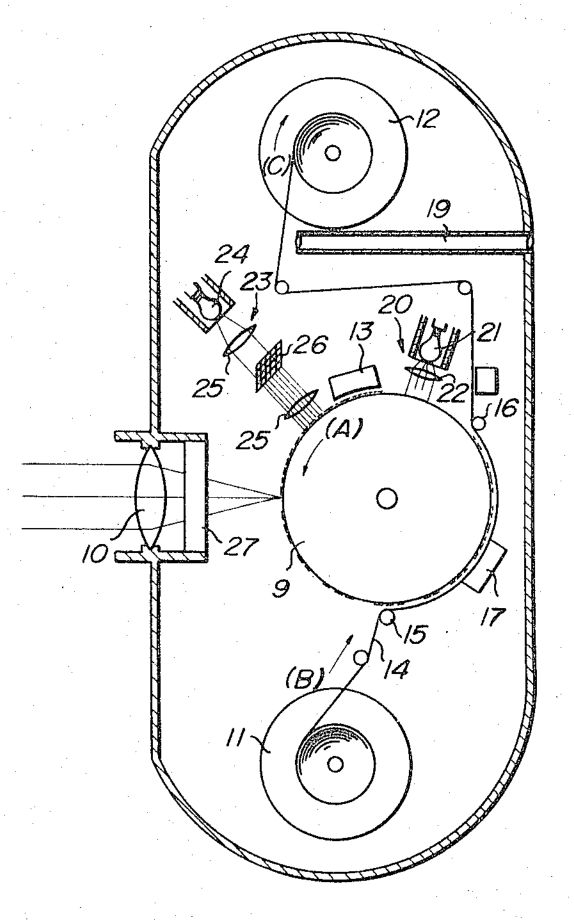
FIG. 4 is a view similar to FIG. 3 showing another form of recording apparatus.

Description will now be made of another embodiment of the present invention illustrated in FIG. 4. The embodiment is not designed to record optical images such as those on a television receiver which are formed of scanning lines but is designed to record an actual landscape or a still or motion picture like an ordinary photographic camera. Those parts of this embodiment which are equivalent to ones of the television recorder shown in FIG. 3 are indicated by like reference numerals and will not be described in any detail. Reference numeral 23 indicates an optical device for making a preliminary mesh or raster exposure to the photoconductive drum 9 and which includes a light source 24, a lens system 25 and a screening element 26. A shutter device 27 is provided which operates in synchronism with the movement of the film 14 and can be omitted in cases where motion picture images, which are intermittent optical images, are to be recorded.

In recording, for example, a landscape with this arrangement, the photoconductive drum 9 is rotated in a direction indicated by the arrow A and its surface is successively electrostatically charged by the corona forming unit 13 and subjected a light exposure by the optical device 23 so that a meshed electrostatic charge pattern is formed on the drum surface. As the drum 9 continues to rotate, the drum surface is exposed through lens system 10 to the light rays from the landscape to obtain a final latent image, which includes the electrostatic charge pattern representing the landscape superposed on the meshed charge pattern. Subsequently, the surface of the photoconductive drum 9 is brought into contact with the film 14 proceeding from the film reel 11 in a direction indicated by the arrow B so that the latent charge image on the drum surface is electrostatically transferred onto the thermoplastic resin surface of the film 14. On this occasion, if the quantity of the electrostatic charges on the surface of the photoconductive drum 9 is insufficient, the bias field forming unit 17 is energized to improve the efficiency with which the electrostatic charge image is transferred. After the image transfer has been effected, the film 14 is separated from the surface of the photoconductive drum 9, then heated by the heating device 18 for image development and finally wound on the take-up reel 12 in a direction as indicated by the arrow C while being monitored by the monitoring unit 19. It will be appreciated that this form of recording apparatus is particularly valuable in recording an optical image of a subject as a deformed image on each frame of the film by facing the lens to the subject and actuating the shutter device 27 in quite the same manner as with a common 35 mm. camera.

It is to be noted, however, that this apparatus can also be used to record a motion picture without actuating the shutter device 27 if it is arranged so that the film 14 is driven from the drive mechanism of a motion picture projector in synchronism with the motion picture film. In addition, the preliminary exposure may be effected with satisfactory results simultaneously with or after the projection of the optical image to the photoconductive drum 9. By effecting such preliminary exposure, the image obtained can exhibit a satisfactory gradation.

Figures 5, 6:
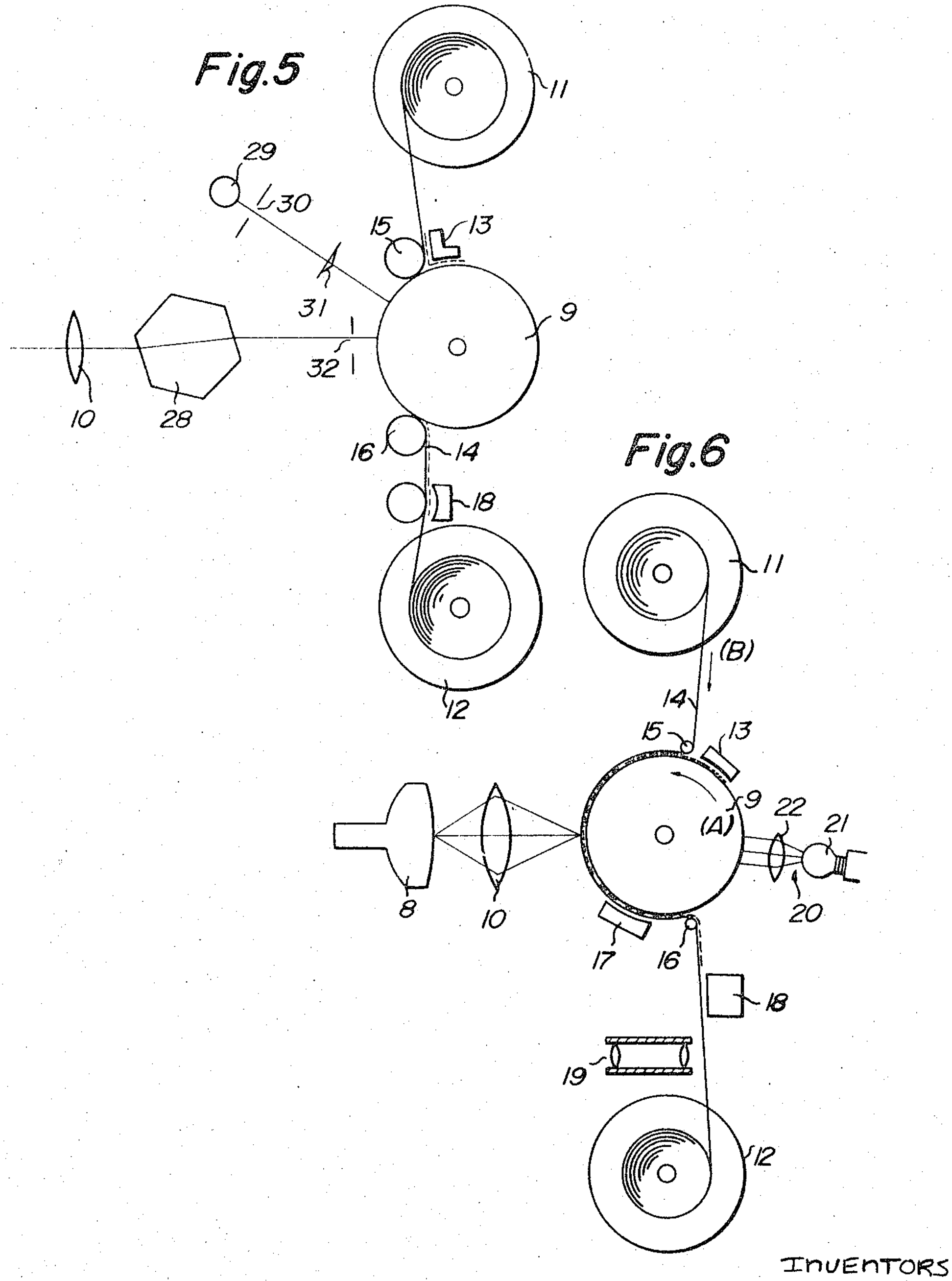
FIG. 5 is a view similar to FIGS. 3 and 4 showing a further form of recording apparatus.
FIG. 6 is a diagrammatic view of another embodiment of the present invention in which exposure is made through a transparent film.

Another embodiment of the present invention is shown in FIG. 5, which also is designed for image recording and reproduction particularly faithful with respect to gradation like the embodiment just described above. With the apparatus of FIG. 5, the light rays from the subject first pass through the lens system 10 and a rotating polygonal prism 28 and further through an apertured slit 32 and a transparent film 14 to focus an optical image of the subject on the photoconductive drum 9, which carries a layer of a photoconductive material such as selenium and is driven at a peripheral speed equal to the speed at which the optical image on the drum surface moves with rotation of the prism 28. Since the distance of travel of the optical image on the drum surface is not in series, the angle between the normal line to the side surface of the rotating prism 28 and the optical axis should be minimized and the polygonal prism 28 should have an even number of sides.

The film 14 is payed out from the film reel 11 and proceeds in a direction of the arrow D to be finally wound on the film reel 12. The film leaving the reel 11 is laid on the surface of the photoconductive drum 9 by a guide roller 15 to proceed with the drum surface to be charged by the corona forming unit 13. A discharge tube 29 is provided to project a light beam onto the drum surface through a slit 30 disposed in front of the tube 29 and through a Fresnel double mirror 31 and the film 14 to form a raster-like interference image on the surface of the photoconductive drum 9. The interference image thus formed blinks at the same frequency as the discharge in the discharge tube 29 so that those portions of the surface of the photoconductive drum 9 which pass the interference area in coincidence with the blinging light from the discharge tube 29 are subjected to exposure a number of times while those portions of the drum surface which do not coincide with the blinking light are moved past the interference area without being exposed to such light in any manner. Consequently, the surface of the photoconductive drum 9 is finely divided into portions subjected to exposure and cleared of any electrostatic charges and the remaining portions subjected to no exposure and thus retaining electrostatic charges, the charged and discharged portions being arranged alternately to form a raster. Therefore, the image of the subject formed on the surface of the photoconductive drum 9 through the optical system 10–28–32 is actually a latent electrostatic charge image of raster form since the drum surface is charged in raster form as described above. As will readily be understood, the latent image is transferred onto the film 14 proceeding in contact with the drum surface. After passage beneath guide roller 16, the film 14 is separated from the drum surface and heated by the heating device 18 for image development. After the developed image has been cooled to be fixed, the film 14 is wound about the film reel 12.

Though with the illustrated embodiment a preliminary light exposure of raster form is made, any other exposure form may be employed including mesh form as long as the size of elementary exposure areas is much smaller than or equal to that of the elementary pictures. In some cases, even an irregular form of preliminary exposure may be employed.

Furthermore, in place of employing an optical device to obtain such preliminary exposure of mesh or raster form, a control grid may be employed with the corona forming unit for intermittent charging to obtain similar results. Also, the photoconductive substance laid on the photoconductive drum may preliminarily be divided physically so that the drum surface may be charged in mesh or raster form.

Referring next to FIG. 6, a modification of the embodiment shown in FIG. 1 will be described, which is a television recorder in which exposure is made through the recording film. Those parts of this embodiment which are equivalent to ones of the first embodiment are indicated by like reference numerals in FIG. 6 and will not be described in any detail.

The photoconductive drum 9 is rotatable in the direction of the arrow A and carries on its surface a layer of a photoconductive substance, which is electrostatically charged by the corona forming unit 13 and subsequently brought into pressure contact with a film 14, which proceeds from the film reel 11 in a direction of the arrow B and over a guide roller 15 onto the drum surface. An optical image on the cathode-ray tube 8 of a television receiver is projected through a lens system 10 and the film 14 on the drum surface to the photoconductive substance thereon, and the electrostatic charges on its areas thus subjected to the light exposure are dissipated to leave a latent electrostatic charge image on the drum surface. The latent image is efficiently transferred to the thermoplastic resin surface of the film 14 when it is moved through an electrical biasing field formed by the biasing unit 17. Passing over another guide roller 16, the film 14 leaves the surface of the photoconductive drum 9 and is then heated by a heating device 18 to become fluidous so that the Coulomb form of the electrostatic charges on the film acts to form a deformed image. Subsequently, the film cools to fix the deformed image and is wound about the film reel 12 while being monitored by a monitoring unit 19 for example including a Schlieren optical system. On the other hand, the surface of the photoconductive drum immediately after it has been separated from the film 14 still carries some electrostatic charges, and is subjected to a uniform light exposure from the exposure unit 20 to be completely cleared of the electrostatic charges. The drum surface is then again electrostatically charged when it passes beneath the corona forming unit 13.

According to this recording system, it will readily be appreciated that fully deformed images can be obtained on a film since the quantity of electrostatic charges given to the film is considerably increased as compared to any pure transfer system.

Having described and shown a few preferred embodiments of the invention, it is to be understood that it is not to be restricted to the details set forth but many changes and modifications can be made without departing from the scope and spirit of the invention defined in the appended claims.

What is claimed is:

1. An apparatus for recording a television signal comprising television picture tube means for reproducing the television signal to be recorded in visual form, means synchronized with the operation of said television picture tube means for skipping two out of every three or four out of every five television picture frames whereby only alternate odd and even television picture frames are reproduced in visual form, electrophotographic means including a layer of photoconductive substance formed on the surface of a constant speed rotatable drum, optical means for directing the visual signal produced by the television picture tube means onto the electrophotographic means for forming an electrostatic image onto the layer of photoconductive substance, a tape of thermoplastic recording medium comprising a layer of thermoplastic resin coated on at least one surface of a transparent film base, means for transferring the latent electrostatic image to the surface of the layer of thermoplastic resin by contacting said surface of the layer of thermoplastic resin with the first mentioned photoconductive layer and subsequently stripping the two apart, said last mentioned means being operative synchronously with the constant speed rotatable drum, and means for heating said film having the layer of thermoplastic resin coated thereon at least to a temperature at which said thermoplastic resin is softened whereby a deformed image is reproduced by the electrostatic forces of the latent electrostatic image on the surface of the layer of thermoplastic resin directly contacted by said first mentioned photoconductive layer.

2. An apparatus as claimed in claim 1 in which the optical means includes means for transmitting the optical image through the film onto the photoconductive layer.

References Cited

UNITED STATES PATENTS

| | | | |
|---|---|---|---|
| 2,022,505 | 11/1935 | Hartley | 178—7.14 |
| 2,928,895 | 3/1960 | Day | 178—6.7 |
| 3,055,006 | 9/1962 | Dreyfoss et al. | 346—74 |
| 3,154,371 | 10/1964 | Johnson | 346—74 |
| 3,162,104 | 12/1964 | Medley | 340—173 |
| 3,196,012 | 7/1965 | Clark | 340—173 |
| 3,248,216 | 4/1966 | Weigl | 95—1.7 X |

BERNARD KONICK, *Primary Examiner.*

J. BREIMAYER, *Assistant Examiner.*